United States Patent [19]
Ajewole

[11] Patent Number: 6,166,758
[45] Date of Patent: Dec. 26, 2000

[54] LED UNIFORMITY CORRECTION WITH IMPROVED UNIFORMITY DISTRIBUTION IN A DESIRED RANGE OF GREY LEVELS

[75] Inventor: Isaac I. Ajewole, Rochester, N.Y.

[73] Assignee: Eastman Kodak Company, Rochester, N.Y.

[21] Appl. No.: 09/224,424

[22] Filed: Dec. 31, 1998

[51] Int. Cl.$^7$ ....................................................... B41J 2/47
[52] U.S. Cl. ...................... 347/240; 347/251; 358/534; 358/429; 358/456
[58] Field of Search .................................. 347/236, 240, 347/246, 251, 131; 358/298, 534, 536, 429, 456, 459; 399/181

[56] References Cited

U.S. PATENT DOCUMENTS

| | | | |
|---|---|---|---|
| 4,455,562 | 6/1984 | Dolan et al. | 347/130 |
| 5,200,765 | 4/1993 | Tai | 347/240 |
| 5,586,055 | 12/1996 | Ng et al. | 702/90 |
| 5,640,190 | 6/1997 | Bollansee et al. | 347/240 |
| 5,666,150 | 9/1997 | Ajewole | 347/240 |
| 5,818,501 | 10/1998 | Ng et al. | 347/250 |

*Primary Examiner*—N. Le
*Assistant Examiner*—Hai C. Pham
*Attorney, Agent, or Firm*—Norman Rushefsky

[57] ABSTRACT

A method is disclosed for calibrating a grey level recording printhead having a plurality of recording elements. The method comprises measuring a parameter of each recording element, the parameter relating to a recording characteristic of the element, in response to measuring the parameter, defining a set of cells of clock periods having time boundaries to determine a set of K quantized clock periods; defining a subset of one or plural contiguous grey values within a set of J grey values recordable by the printhead for recalculation of a subset k of quantized clock periods wherein the number k of quantized clock periods is less than the number K, and recalculating at least some time period boundaries and clock periods for the grey levels j without changing the K total number of K clock periods.

7 Claims, 12 Drawing Sheets

LED UNIFORMITY CORRECTION WITH IMPROVED UNIFORMITY DISTRIBUTION IN A DESIRED RANGE OF GREY LEVELS

FIELD OF THE INVENTION

The present invention relates to non-impact writers and more particularly, to a method for correcting for non-uniformities associated with such writers.

BACKGROUND OF THE INVENTION

The LED printhead consists of several thousand individual LED's. Due to the inherent variation in LED response, the light output varies from LED to LED within the same printhead for the same amount of energizing current. This results in a non-uniform exposure of an otherwise uniform field. This non-uniformity must be corrected in order to produce acceptable images in electrophotographic systems that employ these printheads as exposing devices. In the prior art, this non-uniformity has been corrected by consolidating all the numerous individual LED on-times into a few (e.g., 256) in such a way that the maximum exposure deviation from the average is minimized for each grey level. The approach as set forth in my U.S. Pat. No. 5,666,150, the pertinent content of which are incorporated herein by reference, results in good uniformity required to produce medium-to-high quality images. The limitation of this approach is that it is concerned only with minimizing the maximum exposure deviation from its average without attempting to optimize the distribution of all the intervening exposures. In order to produce the uniformity that is needed for very high quality images, I have determined that it is necessary to optimize the distribution of all exposures (at least for certain critical grey levels) in such a way that enhances the signal-to-noise ratio (snr) for those grey levels. This will be in addition to minimizing the maximum exposure deviation as noted in my patent.

SUMMARY OF THE INVENTION

An object of the present invention is to provide a method for correcting for the inherent non-uniformity in an array of recording elements used on a printhead to the degree that is needed for very high quality images.

In accordance with the invention there is provided a method for calibrating a grey level recording printhead having a plurality of recording elements, the method which comprises (a) measuring a parameter of each recording element, the parameter relating to a recording characteristic of the element; (b) in response to measuring the parameter, defining a set of cells of clock periods having time boundaries to determine a set of K quantized clock periods; (c) defining a subset of one grey value or plural contiguous grey values within a set of J grey values recordable by the printhead for recalculation of a subset k of quantized clock periods wherein the number k of quantized clock periods is less than the number K and (d) recalculating at least some time period boundaries and clock periods for the grey levels j without changing the total number K of clock periods.

The above and other aspects of the invention will become apparent from the following description, the description being used to illustrate a preferred embodiment of the invention when read in conjunction with the accompanying drawings wherein:

DETAILED DESCRIPTION OF THE INVENTION

Because apparatus and methods of the type described herein are well known, the present description will be directed in particular to elements forming part of or cooperating more directly with the present invention.

As stated above, the object of the present invention is to provide an algorithm for correcting the inherent non-uniformity in an array of LED's comprising an LED printhead to the degree that is needed for very high quality images. In order to obtain this degree of uniformity, the algorithm must minimize the maximum exposure deviation from the average for each grey level and optimally distribute all the intervening exposures in a way that enhances the signal-to-noise ratio for at least some critical grey levels. This algorithm represents a method of achieving both goals.

In theory, if all the individual LED on-times could be generated exactly, there would be no need for uniformity correction. Uniformity correction is needed because, in practice, only a few (e.g. 256) potential on-times (which we sometimes refer to as "clocks") are possible. Thus the aim of uniformity correction algorithm is to consolidate all the numerous on-times into this number in such a way as to minimize the maximum deviation from average for each grey level.

I have invented a method for uniformity correction that is capable of producing the level of uniformity that is necessary for very high quality electrophotographic images. There are four main steps involved in this method, each with its own sub-steps:

Step 1: Grouping or Quantizing the LED Light Power Values

Figure 1:
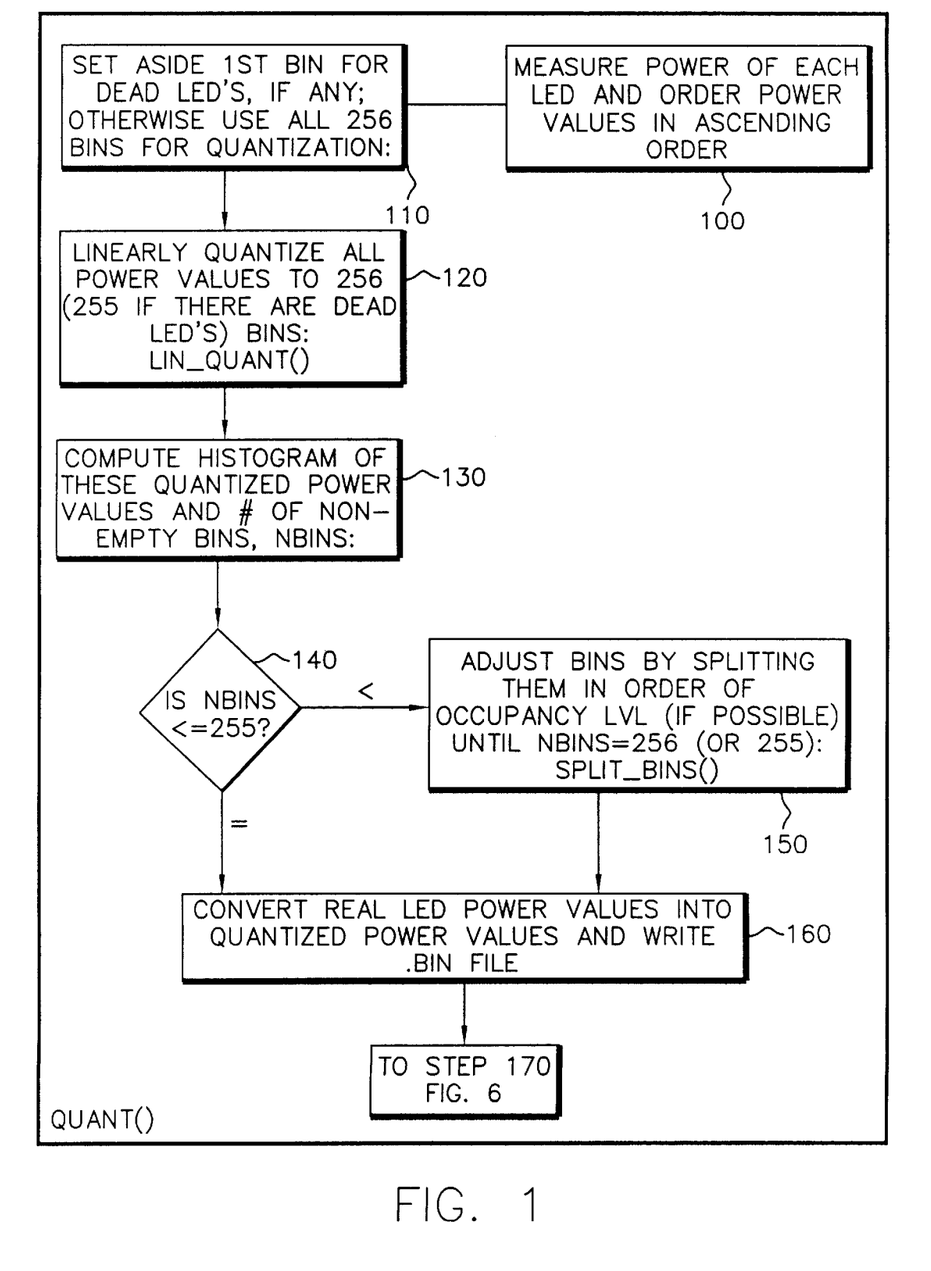
FIGS. 1–3 and 6–10 are a flowchart illustrating an explanation of the calibration method of my invention.

Suppose the number of LED's in the printhead is N and the number of grey levels to be recorded by each LED is J. Then it is possible to have as many as N×J requested on-times. Some of these on-times will coincide but these are usually very few. For a typical printhead N is greater than 5000 and, depending on application, J is less than 256 for example J may be 16 including no exposure. Thus, N contributes much more to the numerousness of the on-times than J. Therefore, the first step in reducing the total number of on-times is to reduce the N possibly different light power values of the LED's into a smaller number M. This is done by grouping (or classifying) the LED's according to their strengths or power of emitted light under the same energizing condition. As a preferred example, I have set M to 256 but the procedure works for any value of M with the quantization error decreasing as M increases. The flowchart for the LED power value quantization step is shown in FIG. 1.

In calibrating the LED printhead, there is attached to the printhead a lens for focusing light from the LEDs. The lens is preferably a Selfoc lens, trademark Nippon Sheet Glass Co., Ltd. However, prior to attaching the lens, measurements are made of the spacing between adjacent LEDs on adjacent LED chip arrays to determine spacing errors (butt-spacing errors) from the nominal ⅙₀₀th of an inch spacing existing between adjacent LEDs on the same LED chip array of a printhead that is nominally, in this example, a 600 DPI (dots per inch) printhead. As noted in U.S. Pat. No. 5,586,055, butt-spacing errors between abutting LED chip arrays can be somewhat offset by modifying the exposures of the LEDs that are incorrectly spaced. For example, two LEDs that are spaced further apart then nominal and used in a discharge area development electrophotographic process may be provided with extra exposure time than would be provided for an LED of the same brightness or power characteristic. When used in a CAD electrophotographic process system, such LEDs would be provided with less exposure time.

In step 100, there is measured and stored each LEDs brightness characteristic or parameter related to light output therefrom and preferably in terms of power $P_i$ where i is the identity of each of the LEDs from 1 to 8624. The 8624 LEDs are located in a single row on the printhead in say 44 chip arrays of 196 LEDs each so that the printhead when later mounted on the copier/printer extends perpendicular to the direction of movement of the photoconductor and extends for substantially the full width of the photoconductor.

The data determined in step 100 is used to calculate a modified brightness characteristic; $P_i^*$, for those LEDs found to have butt spacing errors. An algorithm for modifying brightness for such errors is described in U.S. Pat. No. 5,586,055, the contents of which are incorporated herein by reference.

The range of measured power values (some will overlap) are ordered in ascending order. Any dead LEDs are noted.

In step 110, a first bin is set aside for any dead LEDs, if any. If none are dead, 256 bins are made available for quantization.

Figure 2:
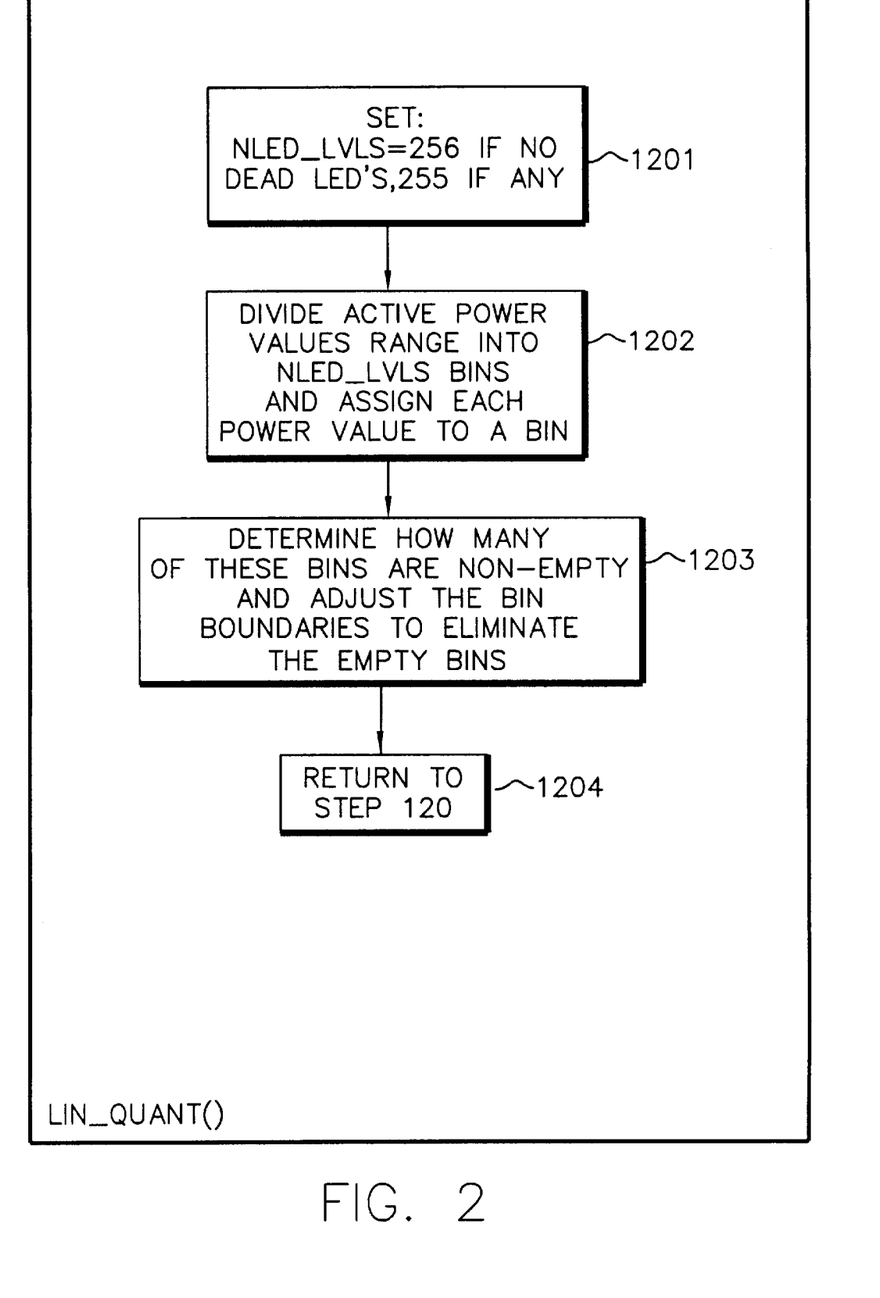

In step 120, the range of power values from minimum to maximum is divided linearly into 256 bins or 255 if there are any dead pixels. Each bin can be identified by an 8-bit value. For the power values falling into each bin, the corresponding LEDs from which these values were measured are assigned to these bins. Step 120 may consist of a series of substeps shown in the lin-quant flowchart of FIG. 2. Thus, in step 1201 a parameter "NLED Levels" is set equal to 256 if there are no dead LEDs, and set to 255 if there are any dead LEDs. In step 1202, the range of measured power values is linearly divided into 255 or 256, as noted above. In step 1203, there is a determination of how many of those bins are non-empty and the bin boundaries are adjusted to eliminate the empty bins. In step 1204, the number of bins and their boundaries are established and return is made to output of step 120.

In step 130, a histogram is calculated of the power values of the LEDs assigned to each bin and the number of non-empty bins are noted.

In step 140, a determination is made if the number of nonempty bins (nbins) is less than or equal to 256 (or 255 for the dead pixel case). If equal to 256 (or 255 for the dead pixel case), the process proceeds to step 160. If less than, the process proceeds to step 150.

Figure 3:
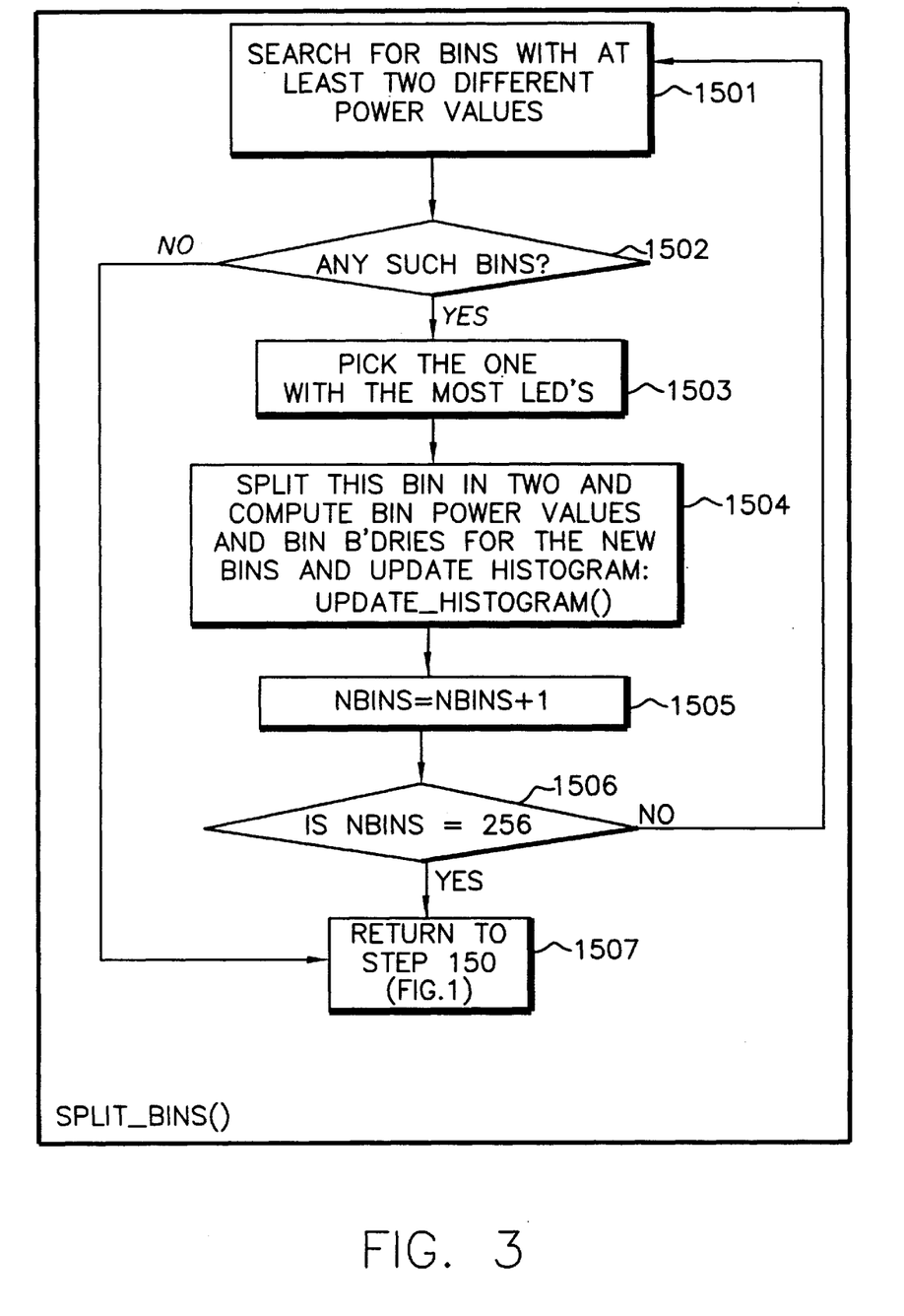

In step 150, if the number of non-empty bins (nbins) is less than 256 (or 255 for the dead pixel case) the bins are adjusted by splitting them in order of occupancy level until nbins is equal to 256 (or 255). In this regard, reference is made to the substeps of step 150 shown in the split_bins flowchart of FIG. 3. In step 1501, a search is made for bins with at least two different power values. In step 1502, a determination is made if there are any such bins. If the answer is yes, the bin with the most LEDs is picked. In step 1504, the picked bin is split in two and bin power values for the LEDs assigned to each of the two new bins are determined as are the boundaries. An update histogram is calculated for each new bin. In step 1505, nbins is set equal to nbins+1 and in step 1506, a determination or decision is made if nbins is equal to 256 (255 for the dead LED case). If the number of non-empty bins (nbins) is not equal to 256, the subprocess of steps 1501–1506 repeats until nbins=256 (or 255). When the decision is yes, in step 1506 the process returns to step 150 (FIG. 1).

In step 160, the LEDs assigned to each bin have their measured or calculated power values averaged and this average power value for each bin is stored and assigned as the quantized power value for each LED assigned to the bin.

Step 2: Quantization of all the LED On-times

Now that all the LED power values have been grouped into M(=256) quantized power values, the remaining objective of the uniformity correction algorithm is to condense (or quantize) all the M*J (J being the number of grey levels) into a much smaller number, K, of representative on-times. This quantization must be done in such a way that each original LED on-time must be representable by one of these quantized on-times producing acceptable uniformity. The value of K is usually dictated by the architecture and associated electronics of the printhead and the printing system; it is typically less than 256. Obviously, the greater K is , the smaller the incurred error and the better the uniformity.

Figure 4:
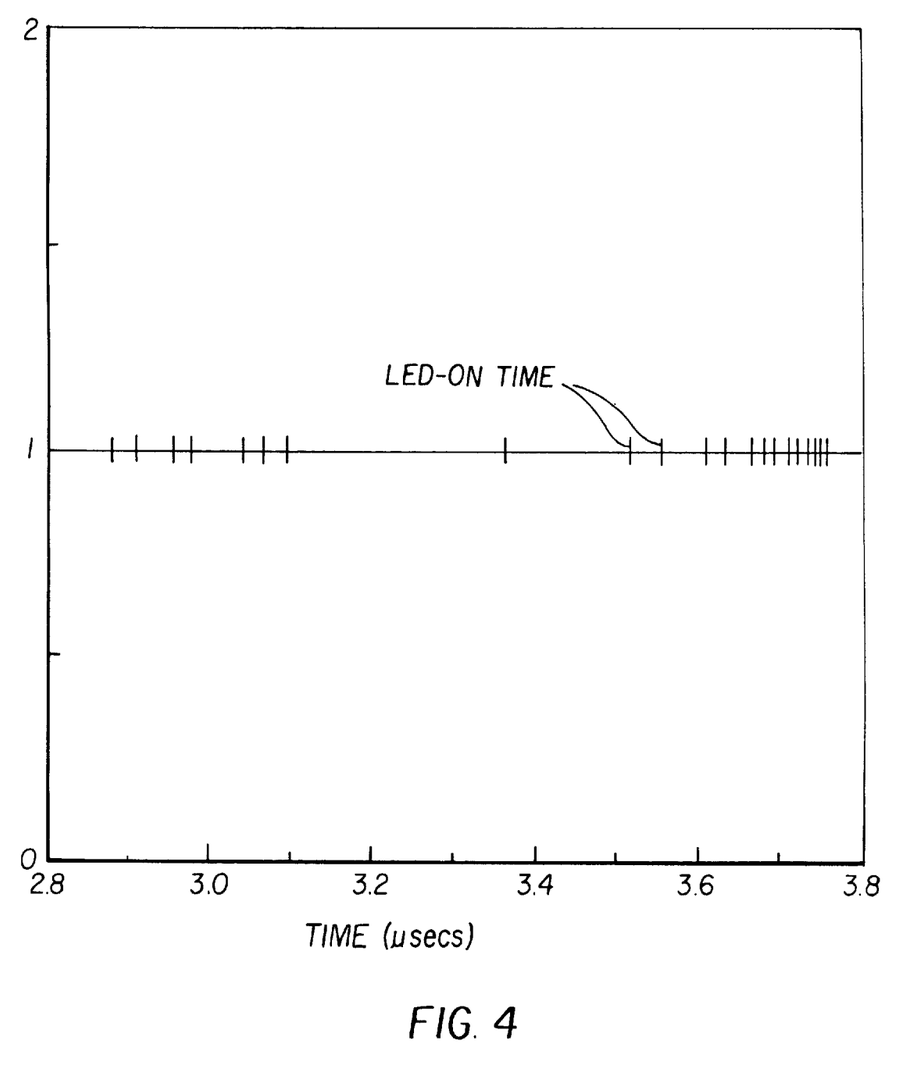
FIG. 4 an illustration of a subset of exposure on-times the full set of which are to be quantized to K discrete clock times.
Figure 5:
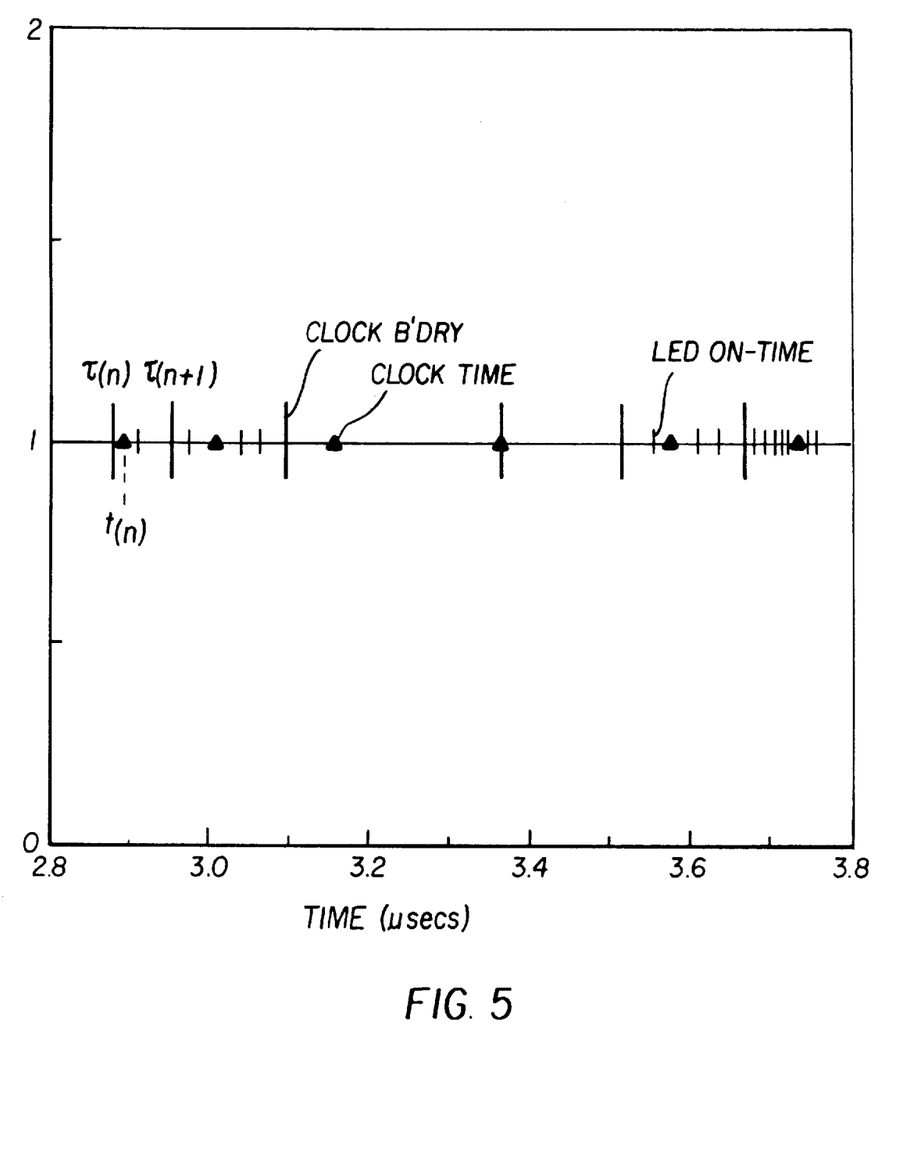
FIG. 5 is an illustration showing how in one example the subset of exposure on-times might be quantized by the method of the invention.

In order to understand exactly what needs to be done, let the energy required to produce grey level j be E(j) in ergs/sq cm. Then the on-time, t(m,j), in micro-seconds for all the LED's represented by the quantized power value P(m) (in watts/dot) is given by $$t(m,j)=E(j)/(c*P(m), j=1 \ldots J \ \& \ m=1 \ldots M$$

where c is a constant depending on the dpi resolution of the printhead (=0.55897 for 600 dpi). The set of all these t(m,j)'s i.e. {t(m,j)} represents the totality of all the on-times and it is this set that must be quantized to K discrete times in such a way that each member of {t(m,j)} can be represented with very little error. A sub-set of {t(m,j)} is shown in FIG. 4 in which all the on-times have been arranged in ascending order. The uniformity correction algorithm divides this set of on-times into 'clock cells', each clock cell having a lower boundary, an upper boundary and a clock value which is called the clock. These clock values (or clocks) are the quantized on-times. All on-times within the clock cell are represented by the quantized value. FIG. 5 shows how the segment in FIG. 4 has been quantized by the method of the invention. In this FIG. 5, the short ticks are the on-times, the long ticks are the boundaries and the triangles are the quantized values.

Figure 6:
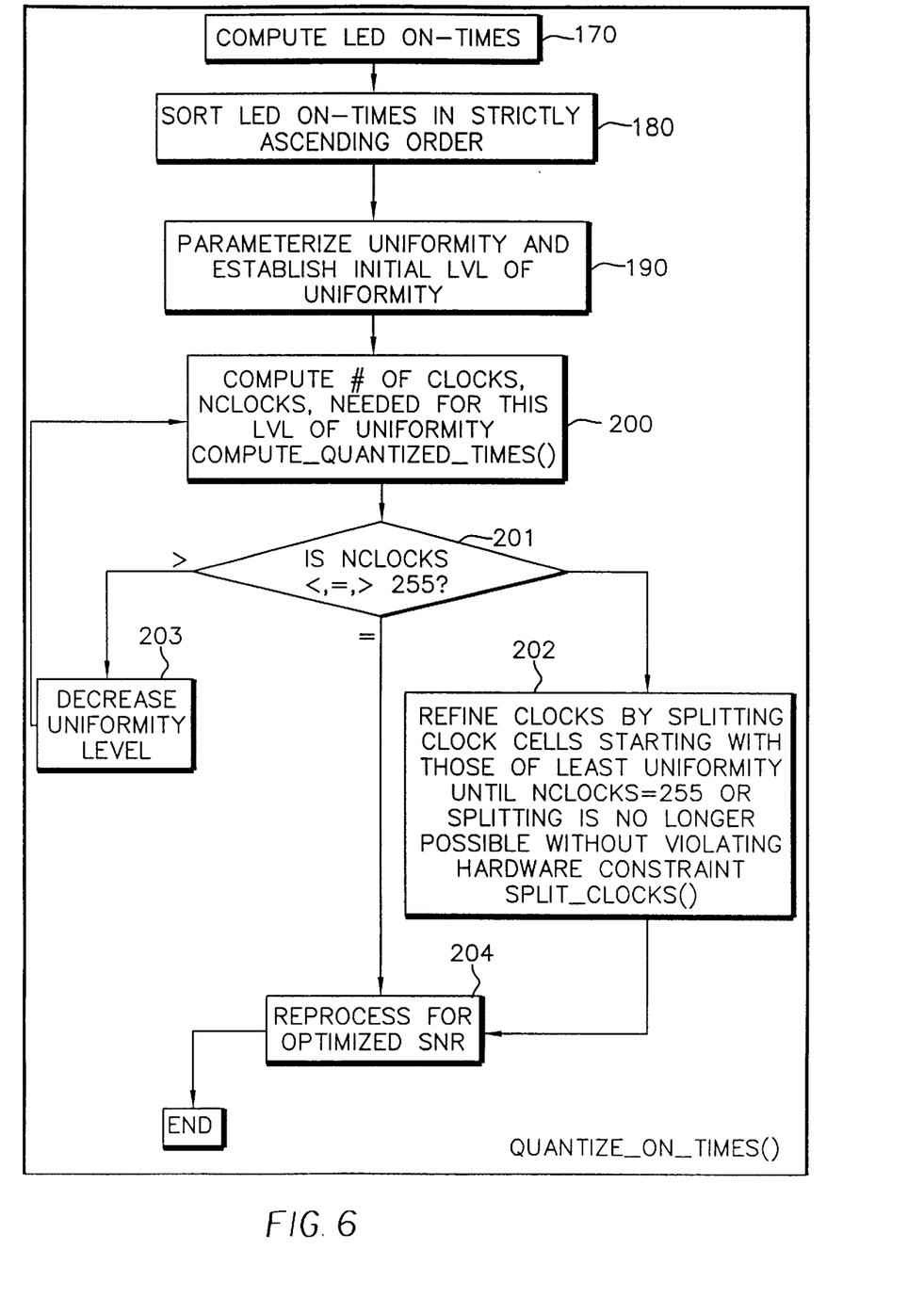

The flowchart for the on-times quantization step is shown in FIG. 6(quantize_on_times() flowchart) with all the substeps as indicated. Each sub-step is further expounded on in its own flowchart as shown in FIGS. 7, 8, 9 and 10. The output of this step is a set of K quantized on-times, the quantization having been done in such a way as to ensure that each original on-time can be represented by one of these quantized on-times with very little error, thereby producing acceptable uniformity for each grey level. Using the resulting quantized on-times, an M×J look-up table which consists of a clock index (a number between 0 and K-1) for each quantized LED intensity at each grey level. These clock indices represent the required on-time for each quantized LED intensity at that grey level.

This procedure has been used on many different distributions of LED intensities and many different distributions of grey levels with very satisfactory results. The resulting uniformity is typically less than 2% for K=64 and J=16.

With reference to FIG. 6, in step 170 the nominal LED on-times for each LED bin is calculated for each grey level. For each grey level, j, there will be a target exposure value E (j) wherein j may be for example a plural number say for example j=1→15. Each exposure value E (j) maybe divided by the quantized power value for each bin stored in step 160 to calculate 15×256 needed exposure times. The number of thus calculated exposure times will probably be less because of some overlap. As even this reduced number of available exposure times is still too great to be used in a system where the architecture can only generate no more than 255 distinct exposure on-times, it is desirable to reduce the number of available exposure times to 255 which can be represented by an 8-bits per pixel value.

In step 180, the calculated large number (thousands) of available exposure times determined in step 170 is sorted in ascending order from $T_{MIN} \rightarrow T_{MAX}$. Preferably, the weakest LED's on-time for recording a maximum density dot (j=15) is used to determine $T_{MAX}$ and the brightest LED's on-time for recording a minimum density dot (j=1) is used for determining $T_{MIN}$.

In step 190, an initial level of uniformity is determined which may be determined using one of several methods identified below or assigned through experience to be say 1% or less.

A function or algorithm for determining uniformity may use a linear or non-linear approach. The function desirably is one that provides maximum uniformity at the lightest of the grey levels but this characteristic is not a requirement. Once this function is chosen, the first step is to reduce this function to a one parameter function suitable for iteration. For a non-linear or arbitrary function, this may have to be done in a piece-wise linear manner. Three exemplary methods are noted below. For simplicity, I illustrate these methods for linear functions but each method is equally applicable to a nonlinear or arbitrary function.

Figure 12A:
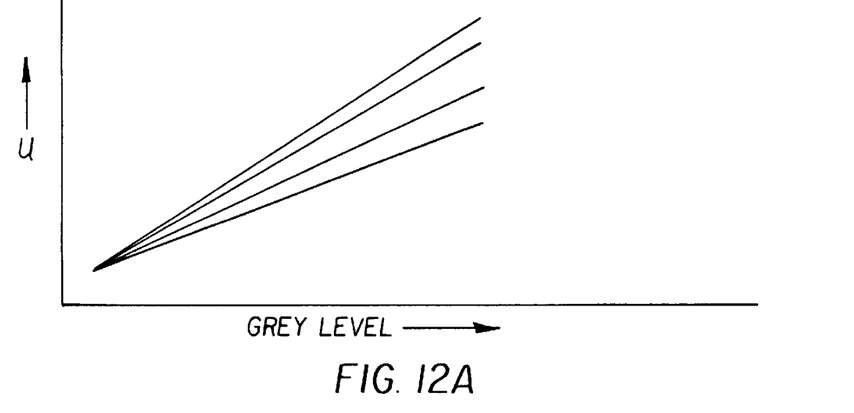
FIGS. 12A, 12B and 12C are a set of graphs illustrating different methods for determining a nonuniformity parameter.

Method A: Increase the non-uniformity parameter u at the high end while holding that at the low end at a desired level. This approach necessitates the re-computation of the slope at each iteration step in this regard reference may be had to FIG. 12A wherein nonuniformlity is the same for each line at the lowest grey level. In a first iteration u would be determined by grey value using one line and if not suitable, u is changed to values on a next line and so on. Thus, requiring calculation of line slope.

Figure 12B:
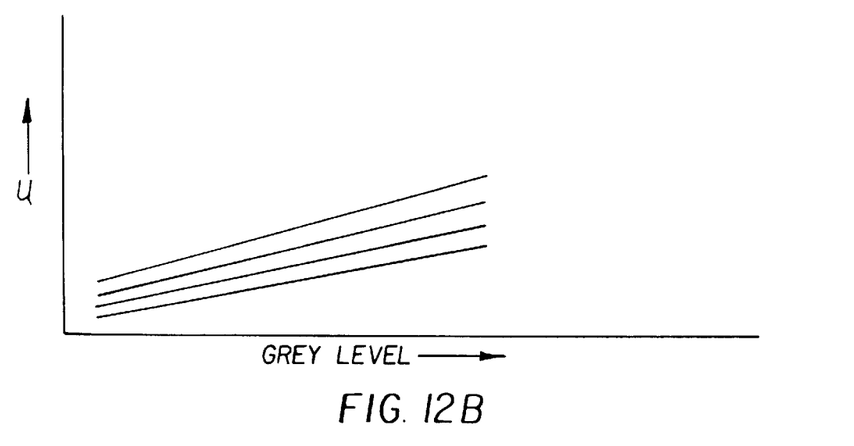

Method B: Increase the non-uniformity at each grey level in such a way as to hold the ratio of maximum to minimum non-uniformity constant at the initial value. This approach also requires the computation of the slope at each step of the iteration in this regard reference may be had to FIG. 12B.

Figure 12C:
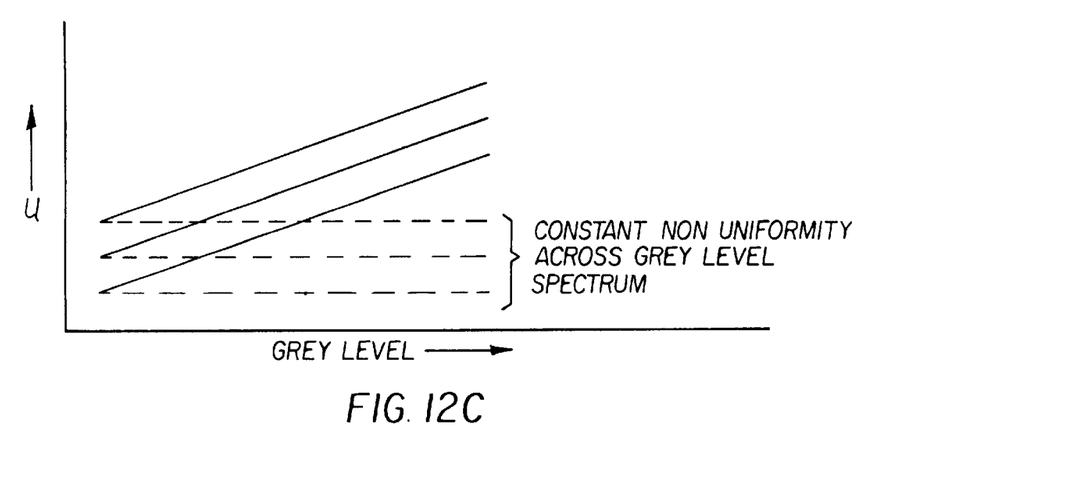

Method C: Increase the non-uniformity at each grey level by the same amount, thereby holding the slope constant at the initial value. A special case of this approach is the case of zero slope (i.e. constant non-uniformity) in which there is one incremental step for the whole grey level range in contrast to one for every grey level in the general case in this regard reference may be had to FIG. 12C.

Functions for establishing different levels of uniformity at different grey levels are described in my U.S. Pat. No. 5,666,150.

Figure 7:
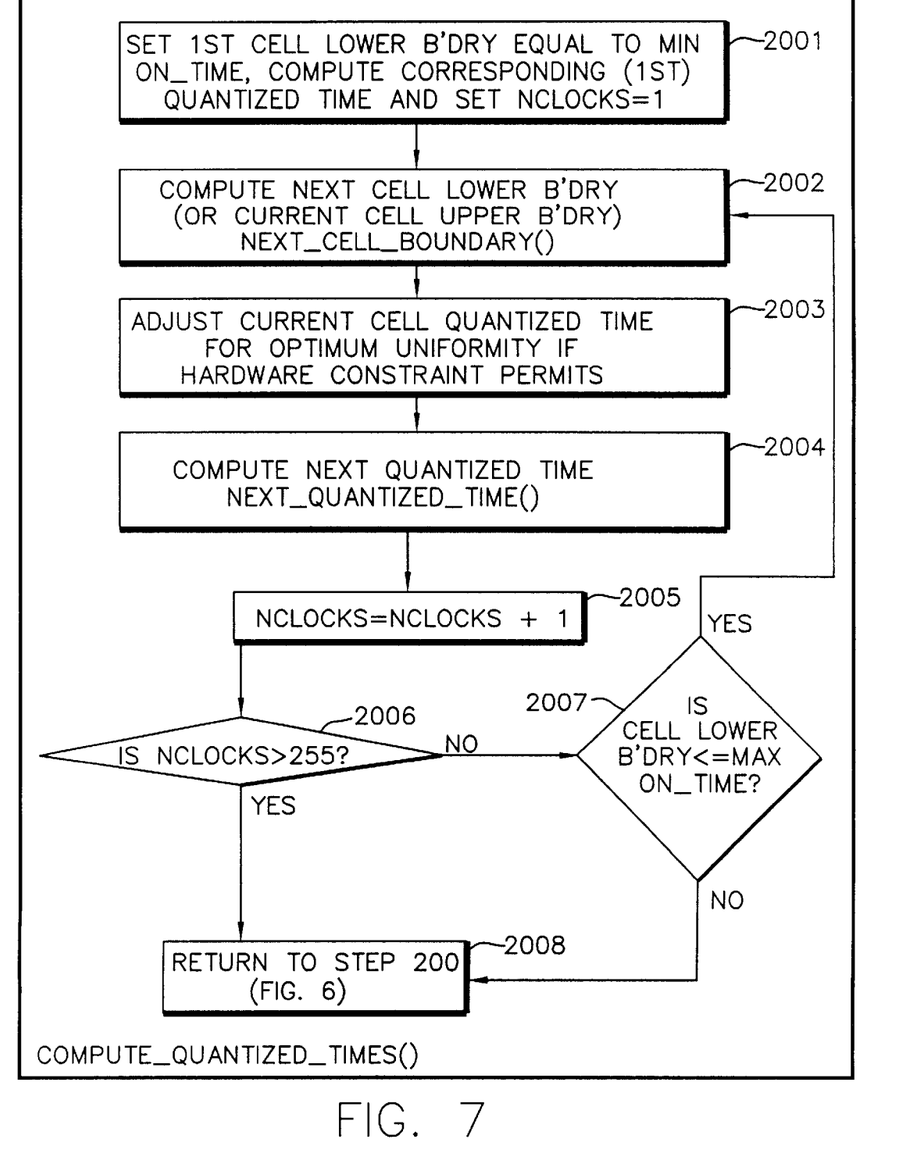

In step 200, there is computed the number of clock times (nclocks) needed for this level of uniformity. Step 200 can be considered as plural substeps shown in the flowcharts of FIGS. 7–9. With reference now to FIG. 7 in step 2001, a lower first cell boundary τ(o) is set equal to the minimum time $T_{MIN}$ (see FIG. 12). The quantized time, t(o), is then determined to represent those calculated exposure times falling between τ(o) and upper boundary τ(1) and which can be represented by quantized time t(o) within a uniformity of u. t(o) can be calculated from t(o)=(1+u)τ(o) or generally t(n)=(1+u)τ(n).

In step 2002, the next cell lower boundary τ(1) (or current cell upper boundary is calculated.

Figure 8:
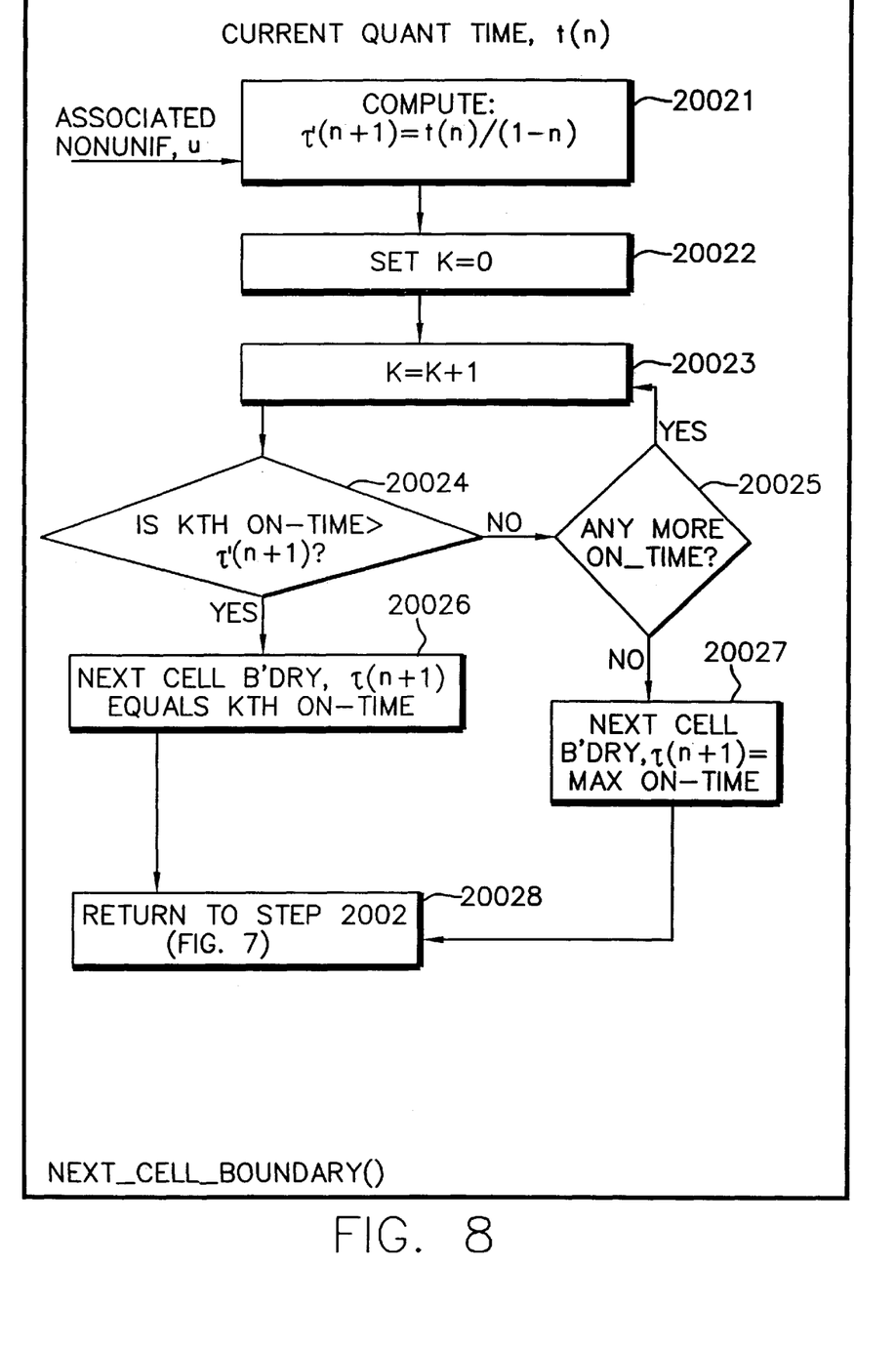
Figure 11A:
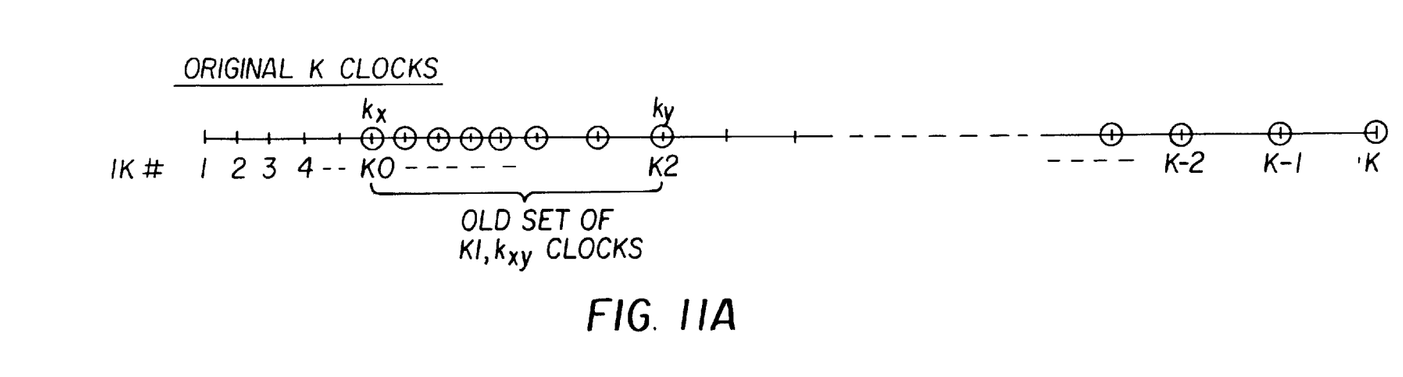
FIGS. 11A and 11B are illustrations showing a subset of exposure clock on-times for an old subset of exposure clocks and a new recalculated subset of exposure clocks.
Figure 11B:
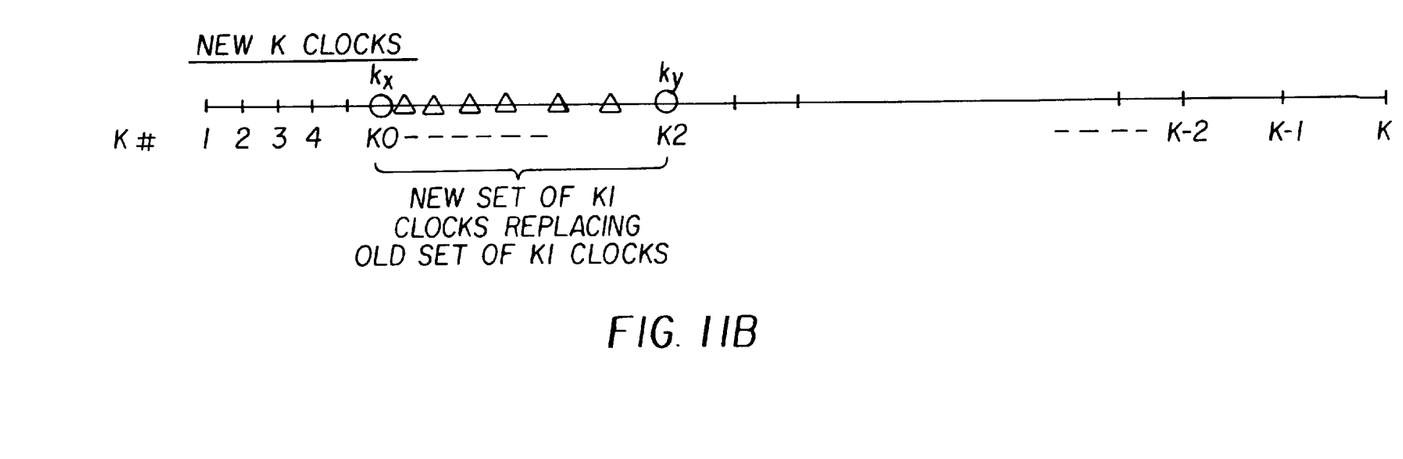

With reference now to FIG. 8 and FIG. 11 which shows various substeps that form a part of step 2002 of FIG. 7. In substep 20021, the next cell lower boundary is computed according to τ'(n+1)=t(n)/(1−u). τ'(n+1) represents a temporary assignment of this next cell lower boundary. A count k is set equal to zero for the first next cell lower boundary, step 20022. In step 20023, k is incremented by one. The term k represents the position of the thousands of clock numbers previously calculated and arranged in ascending order from $T_{MIN} \rightarrow T_{MAX}$ in step 180.

In step 20024, an examination is made if the k th on-time is greater than the calculated boundary τ'(n+1). Note that $T_{MIN}$ has been established as the lower boundary for the first cell. For the upper boundary of the first cell, it is desired that it be placed on one of the thousands of exposure times between $T_{MIN} \rightarrow T_{MAX}$. If the first exposure time value after $T_{MIN}$; i.e. k=1, is not greater than the calculated boundary τ'(1), then the process of incrementing the exposure on-time position number continues through recycle steps 20025, 20023, 20024 until an nclock exposure on-time is found that is equal to or greater than τ'(1). When this is found, the lower boundary for the next cell (or upper boundary for the first cell) which was temporarily assigned as τ'(1) is now made equal to the determined k th on-time and denoted τ'(1) for the upper boundary of the first cell and generally τ(n+1) for the upper boundary of the $n^{th}$ cell. Thus, boundaries are made to fall on calculated exposure on-times determined from the quantized power values for each bin, step 20026. If there are no more exposure on-times in step 20025, in step 20027 the next cell boundary τ(n+1) is set equal to the maximum on-time.

In substep 20028, the process returns to step 2002 in FIG. 7.

In step 2003, the current cell quantized time t(n) is compared with that determined in a prior iteration, if any, to determine if the time spacing between t(n−1) and t(n) is greater than δ which is an exposure clock hardware constraint; i.e., a certain minimum spacing must be provided between exposure clocks. For t(o) there may be a minimum hardware on-time required by the apparatus, too. The time t(n) is adjusted; i.e., made larger until it meets the hardware constraint.

In step 2004, the next quantized time t(n+1) is determined. This step is made up of a series of substeps shown in FIG. 9 (next_quantized_time flowchart). In substep 20041, a count value, j representing grey level is initially set to j=0. In substep 20042, the count value j=1 is incremented 1. In substep 20043, examination is made to determine if the lower boundary τ(n+1) determined in step 2002 is less than or equal to the maximum on-time for the j=1 grey level. The maximum on-time is one of the times previously calculated for an LED in the bin of weakest LEDs to record a grey dot or pixel of grey level 1. This calculation was made in step 170. If the answer is no, j is incremented to j=2 to determine if boundary τ(n+1) is less than or equal to maximum exposure time for a level 2 grey dot by an LED from the weakest binned LEDs. Eventually, the answer will be yes and the process steps to substep 20044. The nonuniformity u for the k th grey level is then set. This value as noted above is either a constant value or the same for each grey level or varies from grey level to grey level as determined by methods A, B, and C described above. In substep 20045, the next quantized time t(n+1) is selected from the minimum of τ(n+1)*(1+u) and the maximum on-time for the k th grey level used in substep 20043.

Figure 9:
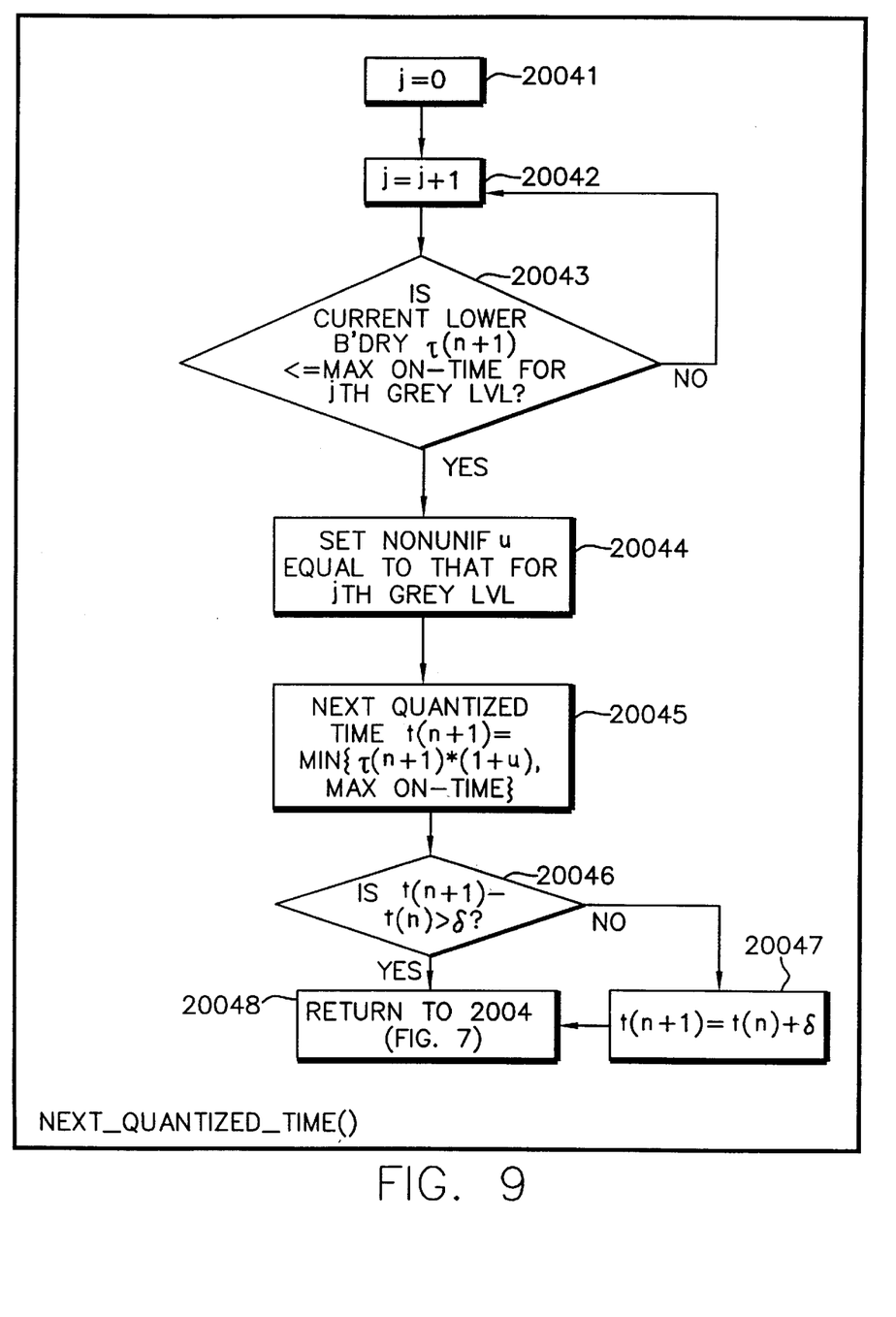

In substeps 20046, an examination is made to determine if the quantized time t(n+1)−t(n)>δ which is the hardware constraint for adjacent clock pulses. If the answer is no, the value of t(n+1) is increased so that t(n+1)=t(n)+δ to thus meet the hardware constraint step 20047. If the answer is yes, the process steps in each case to step 20048 which is a return to step 2004 of FIG. 7.

With determination of clock t(n+1) the process steps to step 2005 wherein the number of exposure clocks (nclocks) is incremented by one to reflect the determination of t(n+1) as an exposure clock. In step 2006, the determined number of nclocks is compared with 255 which is the maximum that will be used in this embodiment which is arbitrary. If nclocks is not greater than 255, the process steps to step 2007 wherein the determination is made whether the cell lower boundary for the current cell, τ(n+1), determined in step 2002 is less than or equal to the maximum on-time $T_{MAX}$ determined in step 170. Typically, the answer will be no and the process steps of 2002→2006 and their various substeps described for the flowcharts of FIGS. 8 and 9 repeat until the determination of step 2007 is no in either of which case the process steps to step 2008 and a return to step 200 of FIG. 6.

In step 201, an examination is made to determine if nclocks is less than, equal or greater than 255.

If the number of determined quantized on-times or nclocks is greater than 255, this implies that the uniformity level, u, that was used was too small and this value needs to be increased to reduce the number of determined quantized on-times. Increasing the value of u results in a decreased in uniformity level, step 203. With a new selected uniformity level u, which is greater than the previous level used, the process returns to step 200 and its various substeps described in the flowcharts of FIGS. 7, 8 and 9 wherein recalculation is made of the nclocks using the new uniformity value or set of values.

In accordance with the invention, there is a process to ensure that the distribution of the final (corrected) power values is optimal, i.e. has the maximum signal-to-noise ratio (snr) possible for each grey level or at least for certain critical grey levels. The procedure described above only ensures that the maximum deviation of the corrected power values from its average is optimal, without any emphasis on the distribution of the intervening power values. In this invention, I provide practical modification of the above procedure to achieve these two goals in order to produce uniformity that is acceptable for high quality images.

The modification for the above procedure to produce uniformity necessary for high quality images comprises two main procedures:

Step 3: Refinement Of Clock Values

I first apply the above procedure for values of nclocks and grey values that are commensurate with high quality uniformity. Typically, these are 255 for nclocks and at least 16 for grey values. If upon this application, the number of clocks (quantized times) emanating from the iterative process is exactly 255 in this example, then this step is not necessary. In general, however, the number of nclocks determined is usually less than 255, indicating that higher uniformity can be achieved. In this case the process enters the refinement stage, step 202, which is shown in flowchart form in FIG. 10 split_clocks(). The refinement consists of splitting each clock cell into two cell in order of decreasing cell non-uniformity i.e. starting with cell with the highest non-uniformity (spacing between t(n) and its upper or lower boundary is a maximum). Of course, splitting a cell is not always possible: a cell can be split if there is more than one on-time within the cell and the resulting two cells will have clock values that do not violate the hardware constraint i.e. quantizations must not be finer than the printhead electronics can handle. These two conditions are amply satisfied if the cell width is greater than three times the minimum separation allowed between quantized times. This condition is checked for highest non-uniformity before the splitting is done. Each time a cell is split, the new clock boundaries and clock values are computed and placed in proper sequence, the number of clocks is incremented by one and the process is repeated. The splitting continues until either no more cells can be split or the number of clocks equals 255 in this example.

Figure 10:
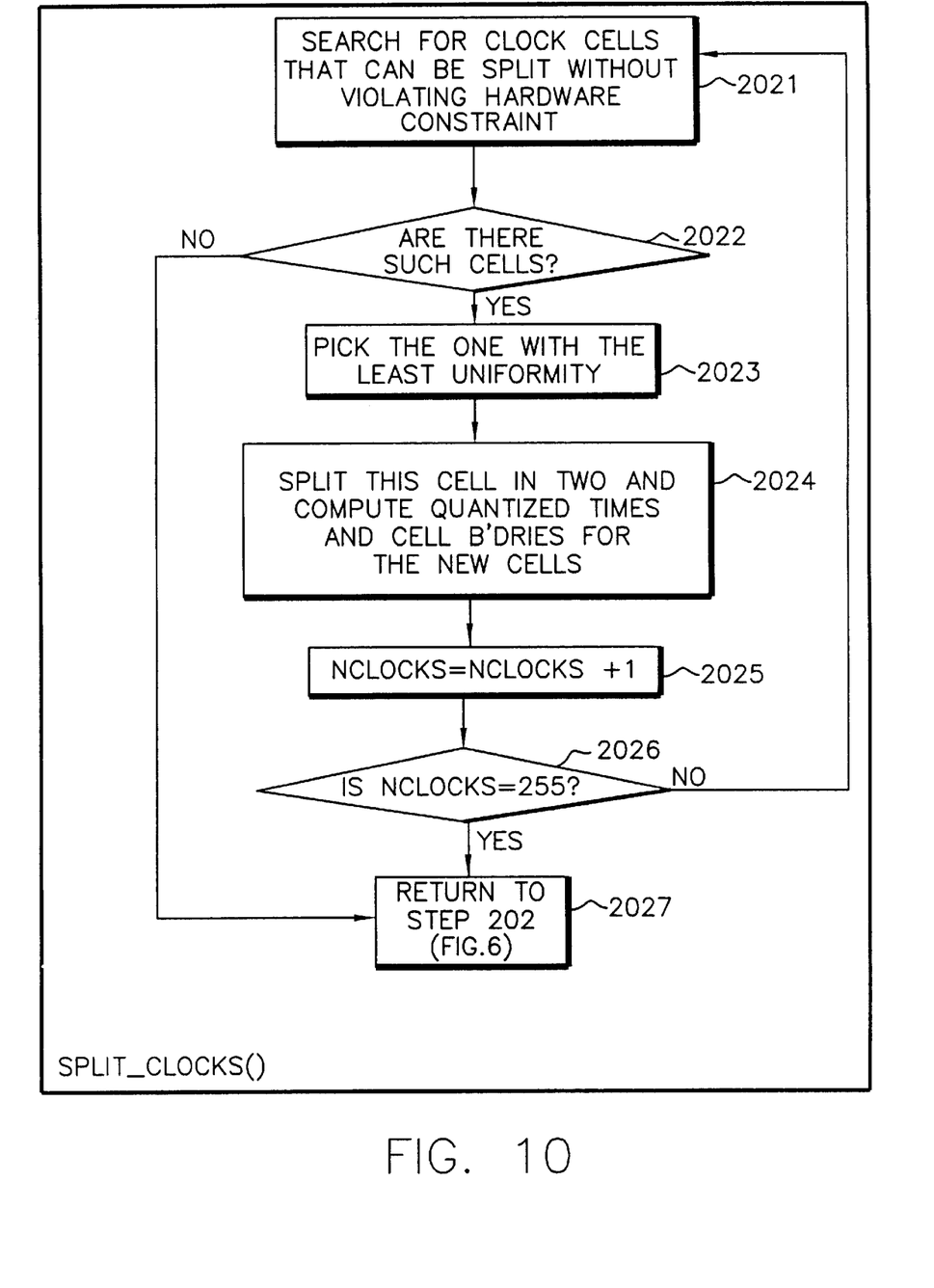

If nclocks is determined to be less than 255 in step 201, then the process steps to step 202 wherein there is a procedure for increasing the number of nclocks by splitting clock cells. The process of splitting clock cells is illustrated in the flowchart of FIG. 10, split_clocks.

In substep 2021, a search is made for clock cells that can be split without violating the hardware constraint of t(n+1)−t(n)>δ for all cases. In substep 2022, a determination is made if there are any such cells. If the answer is no, the process steps to substep 2027, which is a return to step 202. If the answer is yes, the process steps to substep 2023 wherein the cells are examined for the one with the least uniformity; i.e., where τ(n+1)−t(n) is the greatest or where $t_n - \tau_n$ is greatest and thus where u for the cell is a maximum.

In step 2024, this cell is split in two and new cell boundaries are determined for the new cells. For example, the exposure clock t(n), between τ(n) and τ(n+1) may be used as the new boundary and new exposure clocks (nclocks) determined between τ(n) and t(n) and between t(n) and τ(n+1), respectively, say at the midpoint or wherever the hardware constraint is not violated.

In substep 2025, the number of nclocks is then incremented and in step 2026, the determination is made if the number of nclocks is now equal to 255. If not, the process of substeps 2021–2026 is repeated until there are 255 determined nclocks. In substep 2027, the process returns to step 202 (FIG. 6).

In step 202, when 255 nclocks or quantized on-times are determined, the process then enters a reprocessing procedure, step 204, wherein there is a redistribution of the calculated exposure clocks determined in the process of FIG. 6 to provide optimal signal to noise ratio at least for certain grey values.

Step 4: Redistributing the Corrected LED Power Values for Optimal Signal-to-Noise Ratio The procedure used so far does not address the manner in which the power values between the extremes are distributed. It is possible to have many of these power values at the same level as the maximum. The uniformity, by definition, will still be the same but the standard deviation will be higher, leading to low snr. The objective of this process is to ensure that, for at least a few critical grey levels, there are a few as possible power values at the maximum value, with the great majority of them being lower. This will result in smaller standard deviation and higher snr.

The power values redistribution step assumes that the above procedure up to this point has been applied to the J=15 grey levels and has generated K=255 nclocks or quantized exposure on-times. Suppose we want to optimize the corrected intensity distribution for certain plural contiguous grey levels. If the grey levels to be optimized are not contiguous, we break them into contiguous groups and apply the method soon to be described to each group. Let us also suppose that these certain contiguous grey levels $j_x \rightarrow j_y$ (see FIG. 11) use for example 8 of the nclocks or more generally a number $k_{xy}$ nclocks starting from $k_x \rightarrow k_y$. These $k_{xy}$ quantized exposure clocks will be contiguous since the number of grey levels $J_{xy}$ between $j_x \rightarrow j_y$ are contiguous. The first step of the power value redistribution stage is to re-apply the above-described procedure, up to and including the refinement stage which is the split_clocks step, to the $J_{xy}$ grey levels alone for $k_{xy}$ quantized exposure clocks. This differs from the previous described procedure in that only the quantized on-times corresponding to the $J_{xy}$ grey levels need to recomputed and only the same number but new $k_{xy}$ quantized exposure clocks will be generated. This results in better distributions for the corrected power values since all the other quantized on-times or exposure clocks for the remaining grey levels do not influence the obtained new $k_{xy}$ clocks. The uniformity of the remaining grey levels is not negatively impacted either since these new $k_{xy}$ clocks which will replace the old $k_{xy}$ clocks are more closely spaced.

The next step is to re-insert these new $k_{xy}$ clocks into the position occupied by the old $k_{xy}$ clocks. We make sure that this new set of $k_{xy}$ clocks fits well into the K clocks as far as separation between clocks are concerned by forcing the first and last clocks of the new $k_{xy}$ set to be the same as before. The resulting set of K=255 quantized exposure clocks or nclocks is the final set of clocks that will produce high quality uniformity of all the grey levels and maximal snr for some selected grey levels. In lieu of plural contiguous grey levels one may use only one grey level.

In order to optimize the snr for the contiguous grey levels, it is first determined how many quantized exposure clocks $k_{xy}$ were previously determined for these grey levels.

Reference is again made to the flowchart of FIG. 6. In step 200, the recomputation of quantized on-times or nclocks is made using the substeps in the flowchart of FIG. 7. In step 2001, the quantized on-time for the first cell of this range ($k_x$) is set equal to the minimum quantized on-time for the contiguous grey level range $k_x \rightarrow k_y$. The first quantized on-time is set as $k_x$ which was the previous quantized on-time for this range. In step 2002, the lower boundary of the next cell or current cell upper boundary is determined using the flowchart of FIG. 8. Thus, in substep 20021 $\tau'(n+1)=t(n)/(1-u)$ wherein $t(n)$ is $k_x$ for the first cell. In substep 20022, k is set=0; and in substep 20023, k is incremented by 1 to recall a next exposure on-time. There were previously determined in step 170 a series of exposure times by considering the quantized LED power values for each bin and the different energy levels for the different grey levels. The exposure times falling between $k_x$ and $k_y$ are now recalled. The first of these recalled exposure times that is greater than $k_x$ is recalled in substep 20023. In substep 20024, a determination is made as to whether or not the k=1 on-time is greater than the temporary upper boundary $\tau'(n+1)$ for this first cell.

If the answer is no, the next of these exposure on-times is recalled and compared with $\tau'(n+1)$, substeps 20025, 20023, 20024 in an iterative process until one exposure on-time meets the criterion. At which point the answer to substep 20024 is yes and the process steps to substep 20026 wherein the next cell's lower boundary or current cell's upper boundary $\tau(n+1)$ is set equal to that exposure on-time. The process returns to step 2002 wherein it steps to step 2003 to determine if the quantized exposure time $t_x$ or clock number $k_x$ meets the hardware constraint, which it should from previous checking. In step 2004 the next quantized on-time is determined from the next cell's lower boundary $\tau(n+1)$ just previously determined using the flowchart of FIG. 9. In substeps 20041, 20042 the current grey level $j=j_x$ is incremented by one to $j=j_{(x+1)}$. In step 20043, the current cell's lower boundary is examined as to whether or not it is less than or equal to the maximum on-time for the $j=j_{(x+1)}$ grey level. If not, the number j is incremented to determine if $\tau(n+1)$ is less than or equal to the maximum on-time for the next grey level. If the answer is yes, the process steps to sub-step 20044 to set the nonuniformity u equal to that for the current j th grey level. In step 20045, the next quantized time t(n+1) is calculated as the minimum of $\{\tau(n+1)*(1+u)\}$ or the maximum on-time which is $k_y$. In step 20046, a determination is made to ensure that the hardware constraint is met between the first newly recalculated quantized exposure time $t_{(x+1)}$ and $t_x$. If not this time, $t_{(x+1)}$, is adjusted to meet the hardware constraint. In either case, the process then steps to the step 20048 which is a return step to step 2002 (FIG. 7). In step 2002, the process of determining the next cell lower boundary is made according to the flowchart of FIG. 8. The process of finding next cell lower boundaries of recomputed quantized exposure times repeats as described above until the number of nclocks determined is that of $k_{xy}$ and the next quantized time is set equal to $t_y$ which is the quantized exposure clock number $k_y$ as previously determined. The set of recomputed quanitized exposure times K is thus determined.

After the 255 quantized exposure times are determined, the quantized exposure times need to be correlated with the respective 255 or 256 LED bins, so that for each of the 15 grey values there are selected respective 15 quantized exposure times. Previously in step 170, there were computed LED on-times using the target exposure E(j) required to produce grey level j. A set of times t(m,j) previously calculated for a particular bin m can then have each time in this set compared with the quantized exposure times and a closest quantized time selected. After selection of quantized exposure time sets for each bin of LEDs, exposure times may be stored in an exposure or correction look-up table (LUT) as noted in U.S. Pat. Nos. 5,666,150 and 5,818,501 the pertinent contents of which are incorporated herein by reference. The inputs to the exposure or correction LUT would be a pixel data or grey level data signal which say is represented by 4 bits per pixel and an 8 bits per pixel bin data signal identifying the bin assignment for the particular LED. The bin data signal may be output from a "BIN LUT" which has as its input a multibit bit count signal identifying the particular LED. Preferably, the correction LUT is a RAM type of memory.

The output of the exposure or correction LUT is sent to a printhead to be compared by a comparator with a count signal that is decremented/incremented in response to exposure clock pulses. Upon detection of a match, the corresponding LED is turned on and subsequently off. Reference is also made to U.S. application Ser. No. 08/996,782 filed in the names of Mattern et al. regarding a printhead for controlling LED on-times the contents of which are incorporated herein by reference.

There is thus described a method that minimizes the maximum exposure deviation from the average for each grey level and optimally distributes all the intervening exposures in a way that enhances the signal-to-noise ratio for at least some critical grey levels. The algorithm provides for consolidating all the numerous individual on-times for all the grey levels into a few on-times (like 256, depending on system configuration), consolidating only the on-times for those critical grey levels into an appropriately chosen smaller number (i.e. <256 in our example), and blending these two sets of numbers together in a seamless manner to produce a new set of (256) on-times which give the same peak-to-peak uniformity and also an optimal uniformity distribution with enhanced snr. In the detailed description above, there is provided a detailed description of how the consolidation is performed, how one chooses the size of the new subset and how the two consolidated sets of times are blended together.

Although the invention has been described with reference to LED printhead the invention is applicable to recording heads having numerous recording elements for recording images using pixels such as thermal, laser, electrographic, etc.

The invention has been described in detail with particular reference to certain preferred embodiments thereof, but it will be understood that variations and modifications can be effected within the spirit and scope of the invention.

What is claimed is:

1. A method for calibrating a grey level recording printhead having a plurality of recording elements, the method comprising:

(a) measuring a parameter of each recording element, the parameter relating to a recording characteristic of the element;

(b) in response to measuring the parameter, defining a set of cells of clock periods having time boundaries to determine a set of K quantized clock periods;

(c) defining a subset Jxy of one grey value or a plural integer number of contiguous grey values within a set of J grey values recordable by the printhead for recalculation of a subset kxy of quantized clock periods wherein the number kxy of quantized clock periods is less than the number K and Jxy defines fewer grey values than J and J,kxy, and K are integers; and (d) recalculating at least some time period boundaries and clock periods for the grey levels Jxy without changing the total number K of clock periods and without recalculating quantized clock periods of the set of K quantized clock periods that are not in the subset kxy.

2. The method of claim 1 wherein there is calculated a set of clock periods less than K and K clock periods are obtained by splitting cells defined by time boundaries and calculating an additional clock period from determination of new cell time boundaries.

3. The method of claim 2 wherein the set of cells of time periods each have a quantized clock period determined from a respective uniformity value u.

4. The method of claim 3 and after step (d) storing digital data representing a set of K quantized exposure on-times in a memory associated with the printhead.

5. The method of claim 2 and after step (d) storing digital data representing a set of K quantized exposure on-times in a memory associated with the printhead.

6. The method of claim 1 wherein the set of cells of time periods each have a quantized clock period determined from a respective uniformity value u.

7. The method of claim 1 and after step (d) storing digital data representing a set of K quantized exposure on-times in a memory associated with the printhead.

* * * * *